United States Patent [19]

Dichter

[11] Patent Number: 5,502,642
[45] Date of Patent: Mar. 26, 1996

[54] HSL NEIGHBORHOODS IN CMY COLOR SPACE

[75] Inventor: Wilhelm Dichter, Tewksbury, Mass.

[73] Assignee: Linotype-Hell AG, Germany

[21] Appl. No.: 434,862

[22] Filed: May 4, 1995

Related U.S. Application Data

[63] Continuation of Ser. No. 974,516, Nov. 12, 1992, abandoned.

[51] Int. Cl.$^6$ ........................................................ H04N 1/46
[52] U.S. Cl. .............................................. 364/581; 364/526
[58] Field of Search ................................... 364/526, 581; 358/75, 80; 348/32, 33, 34

[56] References Cited

U.S. PATENT DOCUMENTS

| | | | |
|---|---|---|---|
| 5,157,506 | 10/1992 | Hannah | 364/526 |
| 5,297,058 | 3/1994 | Samworth | 364/526 |
| 5,426,596 | 6/1995 | Ogawa | 364/526 |

OTHER PUBLICATIONS

Faulhaber; "Cube–Root Coordinate Color–Difference Computer"; The Review of Scientific Instruments; vol. 35, No. 9, Sep. 1964.

*Primary Examiner*—Ellis B. Ramirez
*Attorney, Agent, or Firm*—Hill, Steadman & Simpson

[57] ABSTRACT

A method for defining a three dimensional neighborhood in a CMY color space. A CMY color space is provided having a gray line therein. The neighborhood is defined by defining boundaries thereof based on at least one correction H, S, L range with respect to the gray line. Changes within the neighborhood may be assigned weighting based on HSL positions of color points therein. With the invention, the hue, saturation, and luminance neighborhoods of a selected CMY color are determined directly from the original CMY image and CMY colors with respect to the gray line.

10 Claims, 4 Drawing Sheets

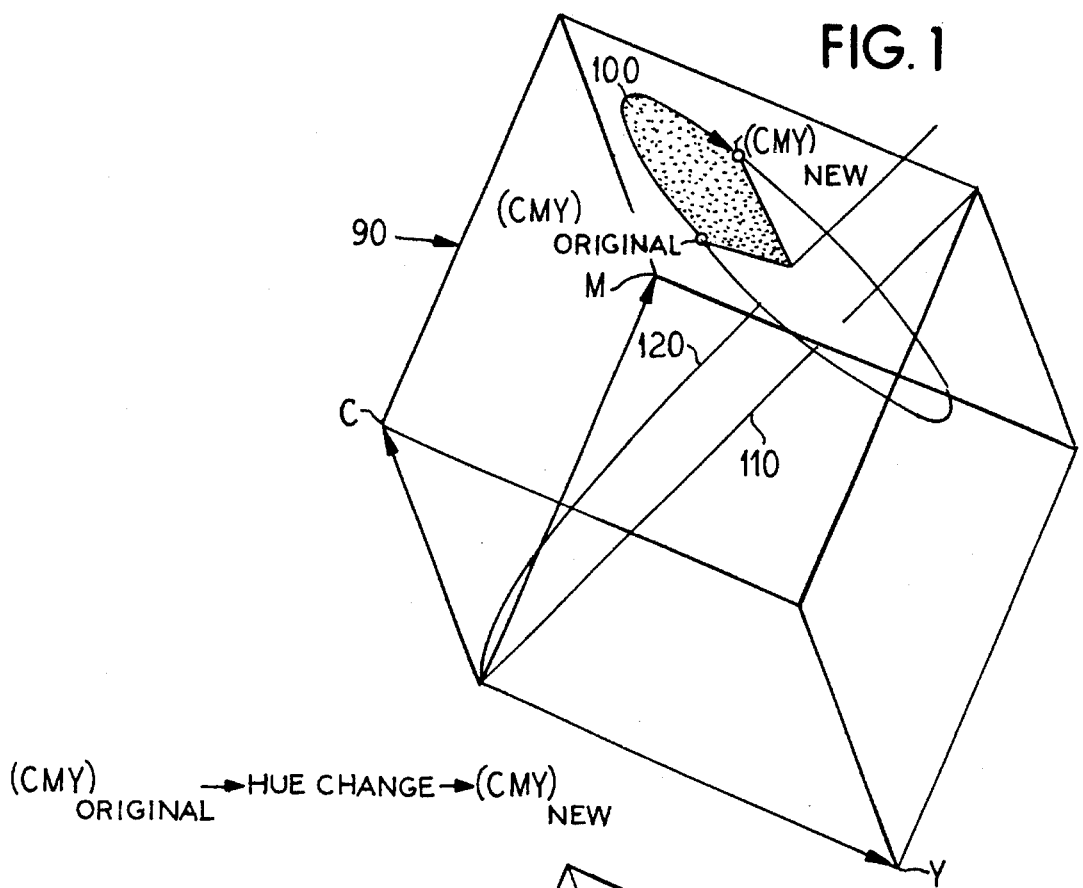
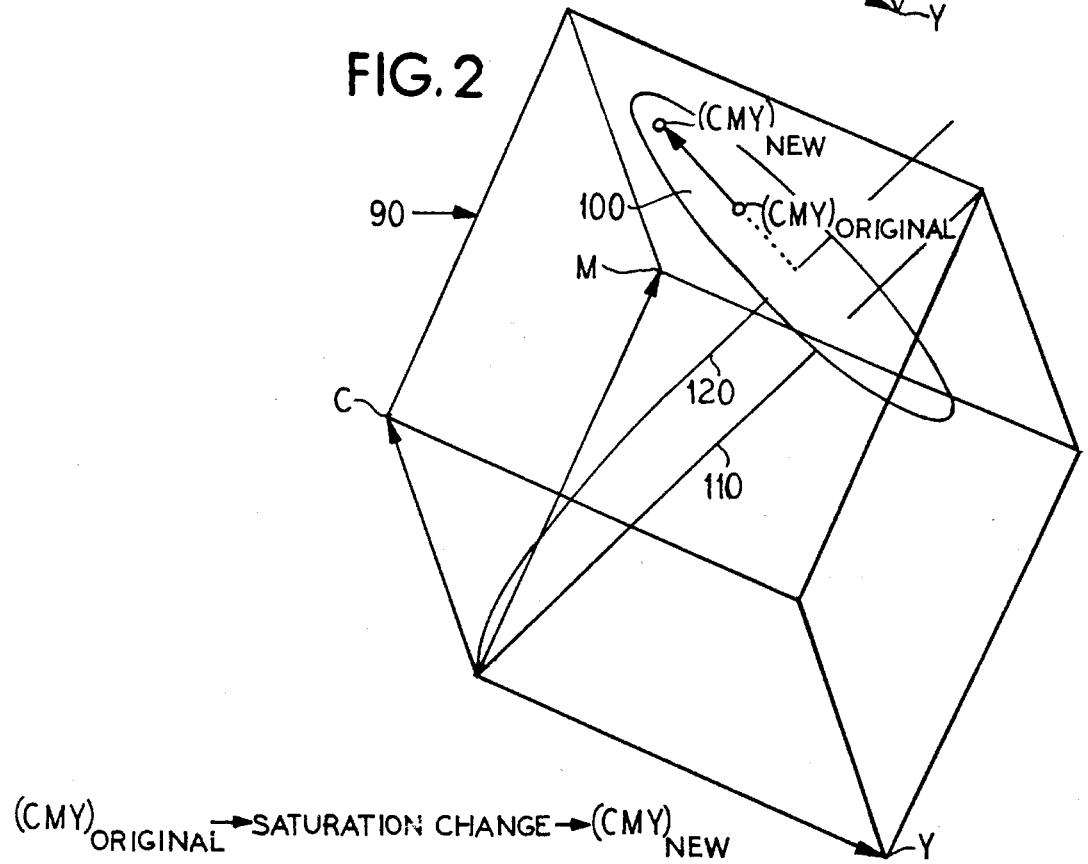

HSL NEIGHBORHOODS IN CMY COLOR SPACE

This is a continuation of application Ser. No. 07/974,516, filed Nov. 12, 1992, now abandoned.

RELATED APPLICATION

This application is related to my co-pending application, Ser. No. 974,529 filed Nov. 12, 1992, titled "HSL CORRECTIONS IN CMY COLOR SPACE".

BACKGROUND OF THE INVENTION

The present invention relates to color manipulation for digital image processing in the prepress industry where color images stored in the computer are visually displayed on an output device such as a video monitor or by a recorder or printer on a recorded or printed output. An HSL (Hue, Saturation, Luminance) weighted mask can be used for any color manipulation, e.g. weighted color corrections, automatic silhouetting etc. Changes visually observable on the output device are executed only in the region of the mask. The results correspond to the human perception of color changes.

As a result of attempts to introduce more intuitive color manipulation, a uniform HSL (or equivalent) neighborhood is created. This requires color space translations and does not allow weighted color change distributions. The data inside the neighborhood is selected for further changes and the data outside of it is rejected.

In this approach it is difficult to: 1) accomplish quality transitions between color spaces; 2) meet precision requirements; 3) achieve interactive performance; and 4) avoid the undesirable effects of binary weighting.

SUMMARY OF THE INVENTION

It is an object of the invention to accomplish quality transitions between color spaces and to provide hue, saturation, and luminance neighborhoods of a selected CMY color directly from the original CMY image and CMY colors.

According to a method of the invention, a three dimensional neighborhood is defined in a CMY color space. The CMY color space has a gray line therein. The gray line is an absence of color but provides steadily increasing luminance therealong. The neighborhood is defined by defining boundaries thereof based on at least one of H, S, L correction ranges with respect to the gray line.

Stated another way, the invention involves the following. The hue, saturation and luminance neighborhoods of a selected CMY color are determined directly from the original CMY image and CMY colors with respect to the gray line, rather than the color cube diagonal. The gray line extends nonlinearly throughout the CMY color space. A weighted mask representing the HSL distance from the selected color, within these combined neighborhoods, is then created.

The HSL weighted mask is an arbitrary function of the HSL distance from the selected color. The mask is created within the combined hue, saturation and luminance neighborhoods in one step without color space translations. All calculations are based on the original image and are performed on a pixel by pixel basis.

An any color color manipulation can be executed within the HSL weighted mask.

With the invention when a neighborhood is defined, in one preferable weighting scheme, the amount of change tapers off as the outer boundaries of the geometrical neighborhood are approached. This results in a smoothing of the change so that the neighborhood blends in with the overall image without abrupt changes at the outer boundaries of the neighborhood.

BRIEF DESCRIPTION OF THE DRAWINGS

FIG. 1 is an illustration of hue change in a CMY color space;

FIG. 2 is an illustration of saturation change in a CMY color space;

DESCRIPTION OF THE PREFERRED EMBODIMENTS

Figure 3:
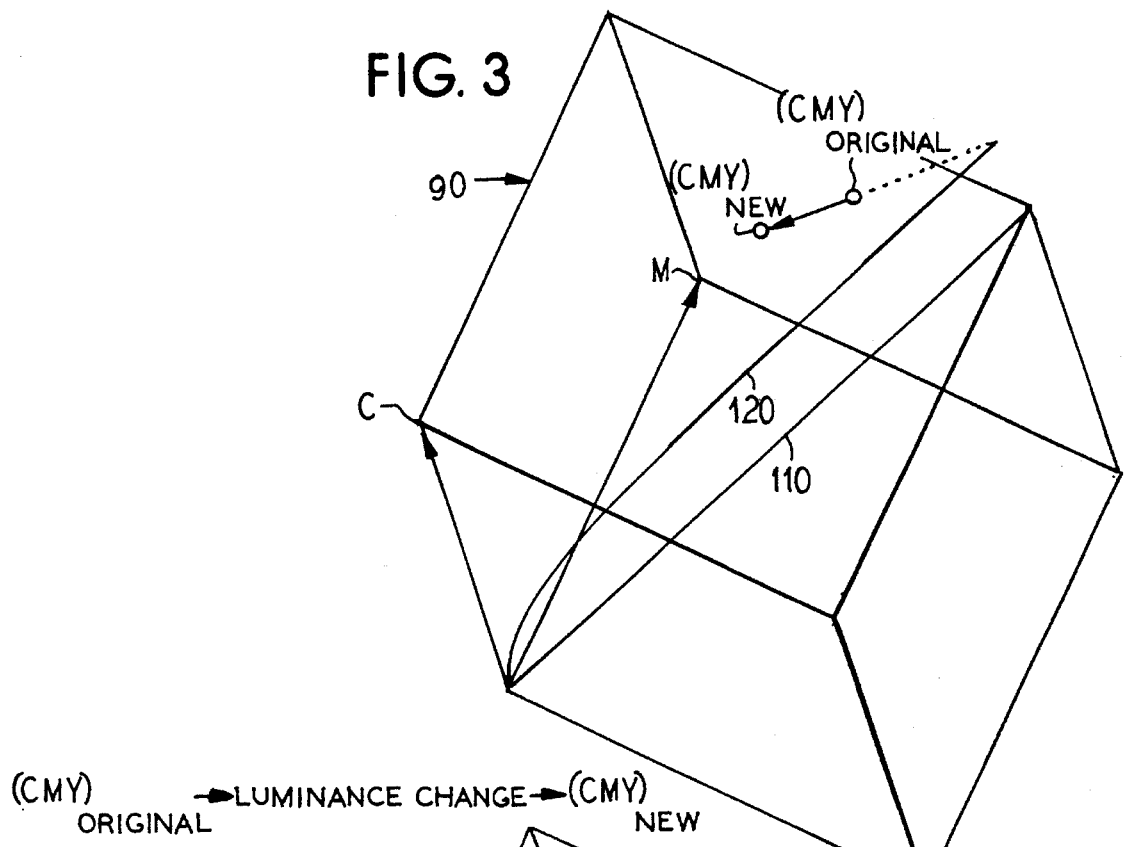
FIG. 3 is an illustration of luminance change in a CMY color space.
Figure 4:
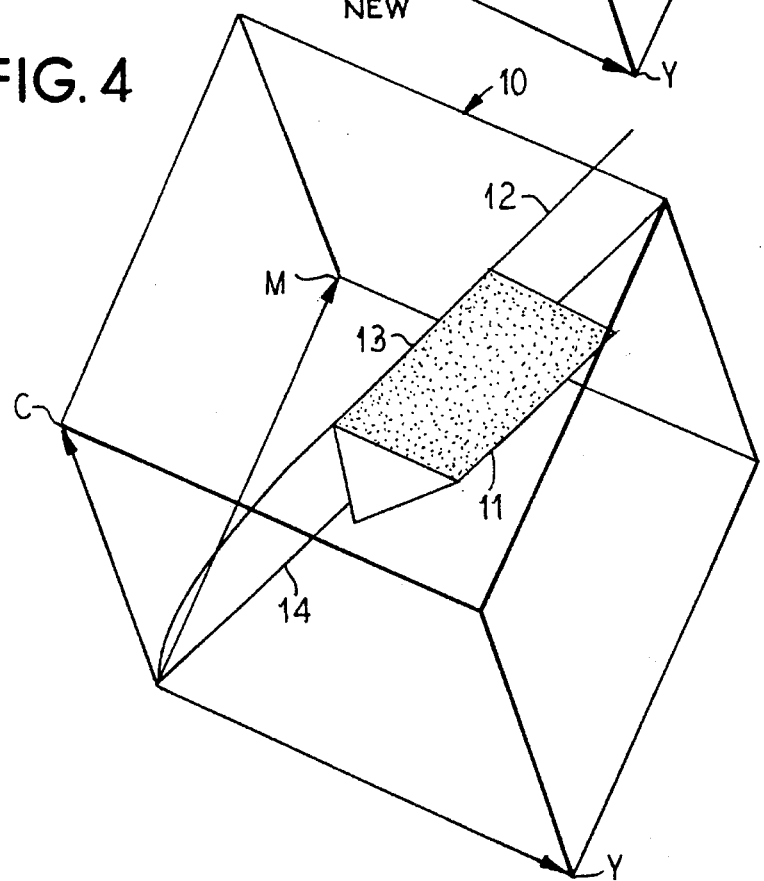
FIG. 4 is a three dimensional geometric illustration of the hue neighborhood in a CMY color space according to the invention.
Figure 5:
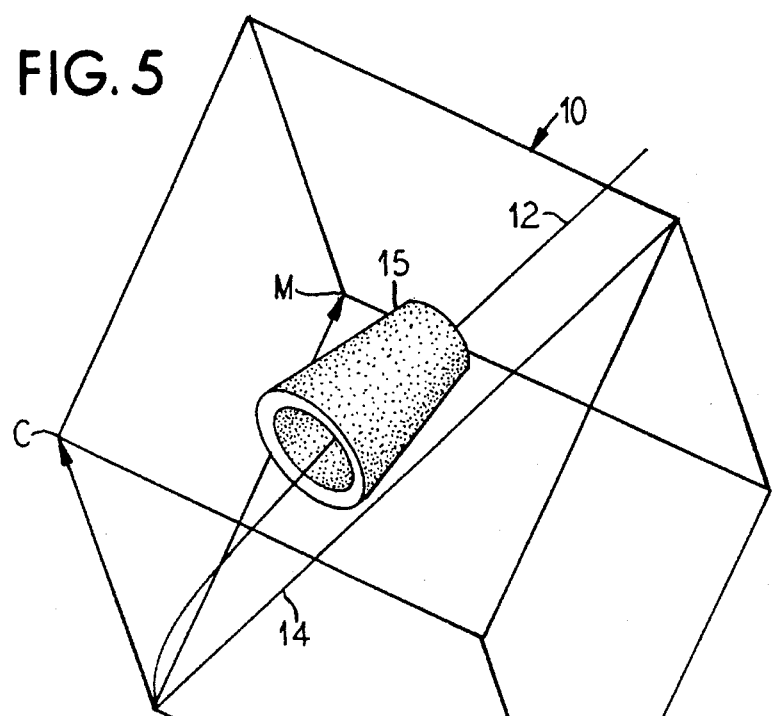
FIG. 5 is a three dimensional geometric illustration of a saturation neighborhood in a CMY color space according to the invention.
Figure 6:
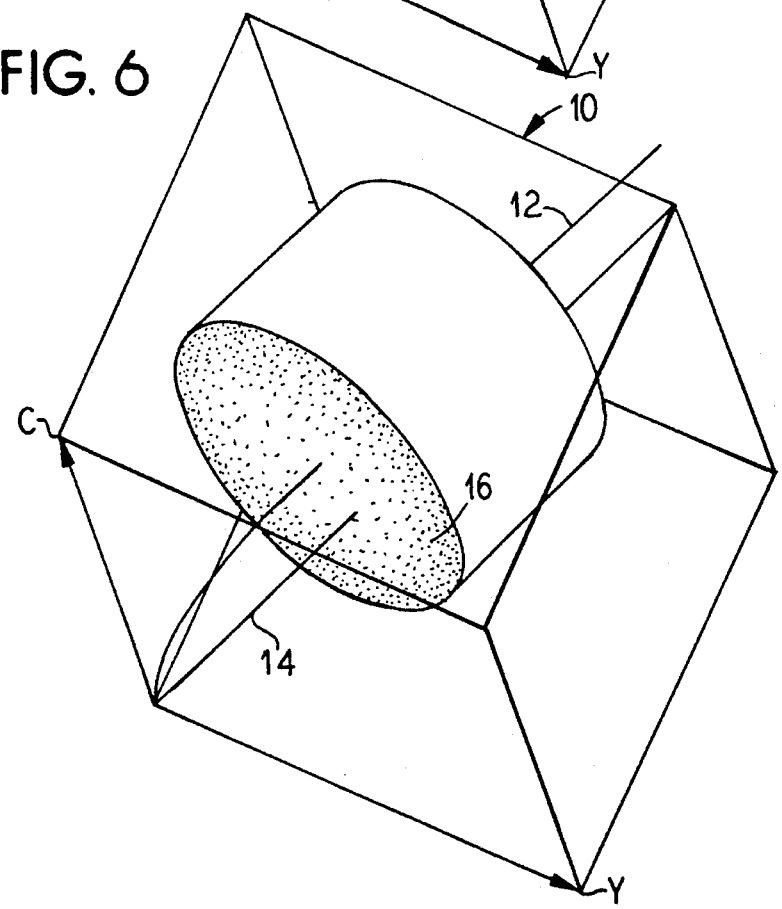
FIG. 6 is a three dimensional geometric illustration of a luminance neighborhood in a CMY color space according to the invention.

As mentioned previously, the present application is related to my copending application titled "HSL CORRECTIONS IN CMY COLOR SPACE", incorporated herein by reference. FIG. 4 of that earlier application corresponding to FIG. 1 herein shows how a hue change is effected in a CMY color space 90 based on the gray line 120 (a gray line is the line which has the absence of color passing through the color space but does represent increasing luminance changes). FIG. 5 in that earlier application, corresponding to FIG. 2 in the present case shows saturation change with respect to the gray line 120, and FIG. 6 in the earlier case corresponding to FIG. 3 herein shows luminance change with respect to the gray line 120. The FIGS. 4, 5, and 6 and description which follow here are an extension of that earlier case in which three dimensional patterns evolve from the planar geometries of FIGS. 1, 2, and 3 herein. These geometries are hereafter kown as HSL neighborhoods. FIG. 4 in the present case shows a hue neighborhood based on the hue wedge shown in the luminance plane 100 as an arc segment in FIG. 1. The luminance plane is perpendicular to the diagonal 110. FIG. 5 is a saturation neighborhood based on the radial saturation change shown in the luminance plane 100 in FIG. 2. FIG. 6 is a luminance neighborhood based on the luminance line 130 shown in FIG. 3 emanating from the end point 140 of the gray line 120.

Steps of the process according to the invention will now be described in greater detail. The determination of HSL neighborhoods from CMY data can be determined as follows.

HUE NEIGHBORHOOD

A hue neighborhood is determined directly from the CMY colors and is described in a CMY color space 10 as a nonlinear wedge 11 with the gray line 12 as its edge 13, as shown in FIG. 4. A diagonal is also shown at 14.

The input data consists of an image as an array of pixels, with the $(CMY)_{original}$ color components specified for each pixel.

For every pixel of the image, the following three steps are carried out:

1. The intersection of the color cube diagonal with a luminance plane perpendicular to it is calculated as:

$$D = \tfrac{1}{3}(Y_{original} + M_{original} + C_{original})$$

2. The cyan component of the gray line intersection with a luminance plane is calculated as the empirically established function of the intersection of the color cube diagonal with the same plane:

$$C_{gray} = f_c(D)$$

3. The hue is calculated as:

$$HUE = \arctan \frac{Y_{original} - M_{original}}{\sqrt{3}\ (C_{gray} - C_{original})}$$

SATURATION NEIGHBORHOOD

As shown in FIG. 5, a saturation neighborhood is determined directly from the CMY colors and is described in the CMY color space 10 as a nonlinear hollow cone 15 surrounding the gray line 12.

The input data consists of an image as an array of pixels, with the $(CMY)_{original}$ color components specified for each pixel.

For every pixel of the image, the following four steps are carried out:

1. The intersection of the color cube diagonal with a luminance plane perpendicular to it is calculated as:

$$d = \tfrac{1}{3}(Y_{original} + M_{original} + C_{original})$$

2. The luminance, measured along the gray line from the point of minimum luminance to a given color luminance plane, is calculated as the empirically established function of the color cube diagonal intersection with the same plane:

$$LUM = f_{lum}(D)$$

3. The intersection of the gray line with a luminance plane is calculated as the empirically established function of the color cube diagonal intersection with the same plane:

$$Y_{gray} = f_Y(D), M_{gray} = f_M(D)\text{ and }C_{gray} = f_C(D)$$

4. The saturation is calculated as:

$$SAT = \arctan \frac{\sqrt{(Y_{original} - Y_{gray})^2 + (M_{original} - M_{gray})^2 + (C_{original} - C_{gray})^2}}{LUM}$$

LUMINANCE NEIGHBORHOOD

As shown in FIG. 6, a luminance neighborhood is determined directly from the CMY colors and is described in the CMY color space 10 as a group of contiguous planes 16, perpendicular to the color cube diagonal 14.

The HSL weighted mask is an arbitrary function of the HSL distance from the selected color.

The input data consists of an image as an array of pixels, with the $(CMY)_{original}$ color components specified for each pixel.

For every pixel of the image, the following two steps are carried out:

1. The intersection of the color cube diagonal with a luminance plane perpendicular to it is calculated as:

$$D = \tfrac{1}{3}(Y_{original} + M_{original} + C_{original})$$

2. The luminance, measured along the gray line from the point of minimum luminance to a given color luminance plane, is calculated as the empirically established function of the color cube diagonal intersection with the same plane:

$$LUM = f_{lum}(D)$$

HSL NEIGHBORHOOD WEIGHTED MASK

The input data consists of an array of pixels, with the HUE, SAT, and LUM color components being specified for each pixel.

The HSL weighted mask is the following arbitrary function:

$$0 \leq d = f[HUE, SAT, LUM] \leq 100\%$$

Figure 7:
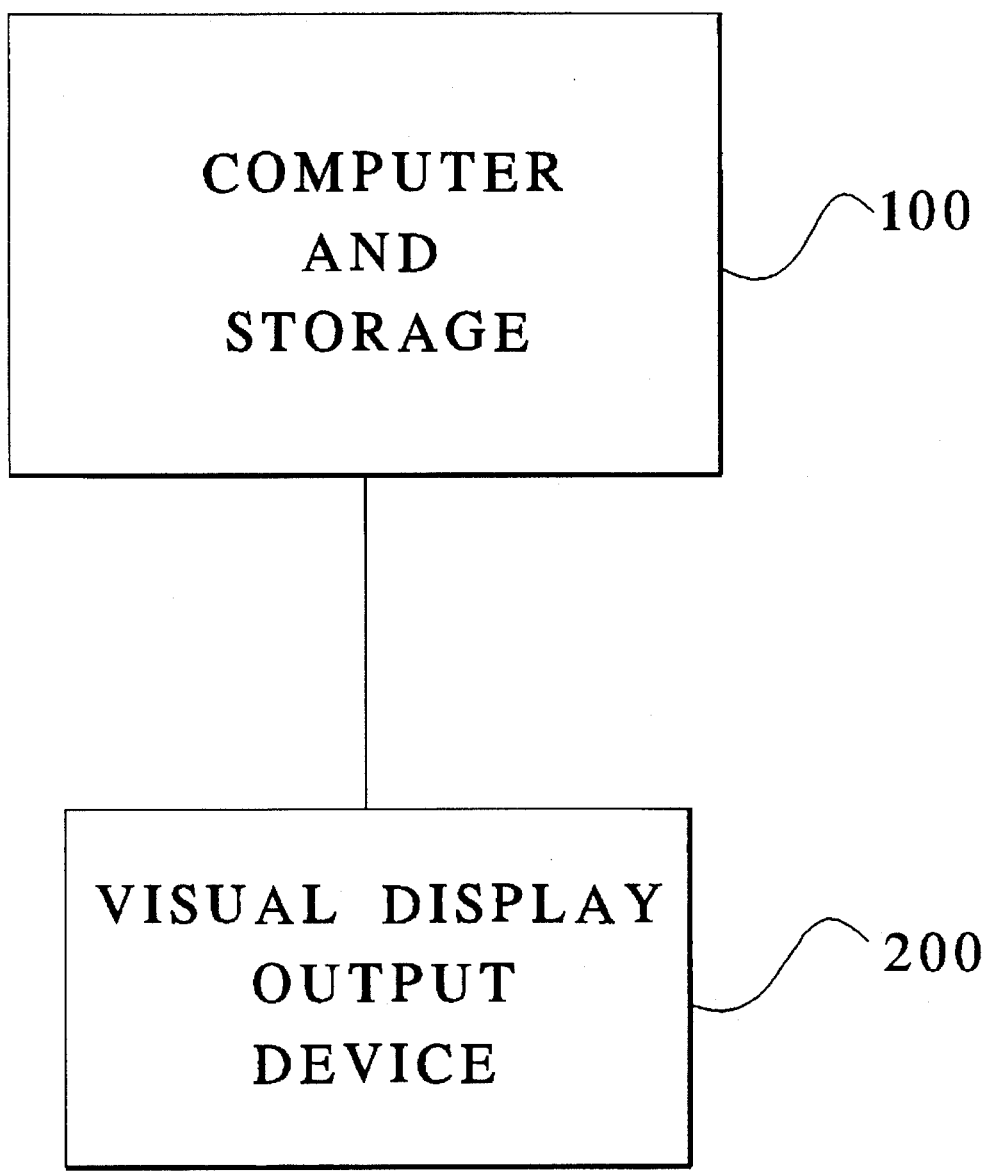
FIG. 7 is a block diagram showing the computer and visual output device for receiving the color manipulated output image according to the invention.

As shown in FIG. 7, a computer 100 executes the color manipulation according to the invention and displays the color manipulated image on a visual output device 200 such as a video monitor or a recorder or printer creating a recorded or printed output.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for color manipulation of a color image stored in a computer in digital image processing wherein the color image is visually displayed by an output device of the computer, comprising the steps of:

providing a CMY color space having a gray line therein, the gray line being a line which passes through the CMY color space and has absence of color therealong;

defining a three-dimensional neighborhood in said CMY color space for the color manipulation of the color image as visually displayed on the computer output device by defining boundaries thereof based on at least one H, S, and L (hue, saturation, and luminance) correction range with respect to the gray line;

assigning a weighting within the three-dimensional neighborhood based on H, S, L positions of color points within the neighborhood;

checking for pixels of the color image to be manipulated whether color values of those pixels lie inside or outside the three-dimensional neighborhood, and if they lie inside the neighborhood, then utilizing the assigned weighting for those color values to change the color value of those pixels to create a new color image which has been color manipulated in accordance with the defined H, S, L neighborhood; and visually displaying the new color image on the computer output device.

2. A method according to claim 1 wherein a hue neighborhood is defined by a non-linear curved wedge having the gray line as an edge thereof so that the wedge follows the gray line.

3. A method according to claim 1 wherein for defining a saturation neighborhood, a non-linear curved hollow cone which surrounds and follows the gray line with the gray line passing substantially through its center is provided.

4. A method according to claim 1 wherein a luminance neighborhood is defined as a group of contiguous luminance planes forming a curved cylinder which follows along its center the gray line.

5. A method according to claim 1 wherein the weighting smoothly decreases from an interior of the neighborhood to the outer boundaries thereof to provide a smooth transition from the neighborhood to the surrounding color space.

6. A method according to claim 1 wherein for the entire color image in the color space, checking each pixel thereof to determine whether it is inside or outside the three dimensional neighborhood.

7. A method according to claim 1 wherein when defining the neighborhood by defining boundaries based on at least one of the H, S, and L correction ranges, defining a movement using the gray line as a point of reference.

8. A method according to claim 7 wherein said movement for hue is an arc segment of a circle lying in a luminance plane and having the gray line as its center as described in the CMY color space.

9. A method according to claim 7 wherein said movement for saturation is a movement along a radius of a circle lying in a luminance plane as described in said CMY color space.

10. A method according to claim 7 wherein said movement for luminance comprises a movement along the gray line as described in said CMY color space.

* * * * *